Jan. 10, 1939. P. T. FARNSWORTH 2,143,145
PROJECTION MEANS
Original Filed Nov. 6, 1934
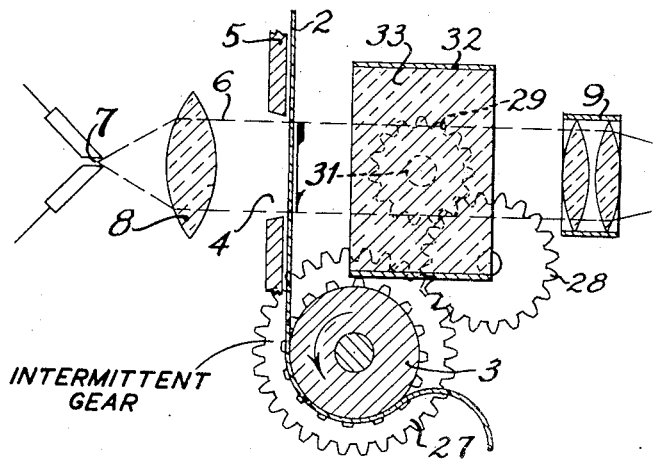
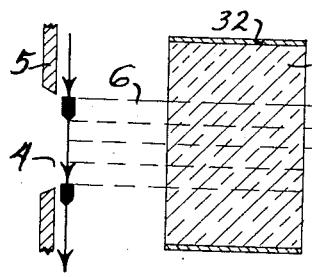
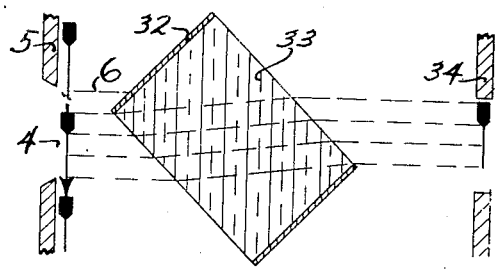
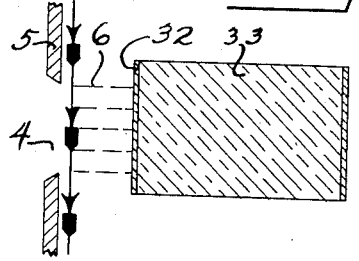
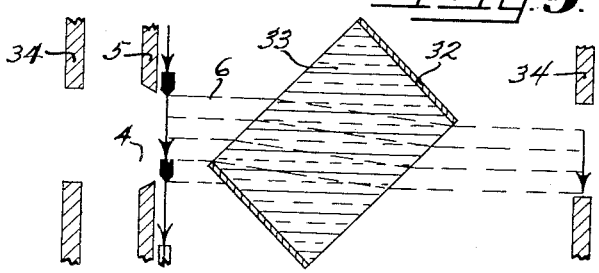
INVENTOR,
PHILO. T. FARNSWORTH
BY
Lippincott & Metcalf
ATTORNEYS.

Patented Jan. 10, 1939

2,143,145

UNITED STATES PATENT OFFICE 2,143,145

PROJECTION MEANS

Philo T. Farnsworth, San Francisco, Calif., assignor to Farnsworth Television Incorporated, San Francisco, Calif., a corporation of California Original application November 6, 1934, Serial No. 751,716. Divided and this application July 1, 1935, Serial No. 29,243

5 Claims. (Cl. 88—16.8)

My invention relates to apparatus for the projection of motion pictures, and particularly to such apparatus adapted to be used in conjunction with a television transmitter; this application being a division of my co-pending application, Serial No. 751,716, filed November 6, 1934, for projection apparatus.

Among the objects of my invention are: To provide, in motion picture projection, a shutter which permits a longer interval of exposure of picture areas between periods when the light beam is cut off to permit shifting of the film; to provide a shutter which, when operated with a projector having a moderate speed film shifting mechanism, produces the effect of a high speed mechanism, by shortening the cut-off period between successive exposures of the film; to provide, in apparatus of the character described, projection means for a motion picture film, which, while operable to project a series of images considerably in excess of the frequency necessary to maintain persistency of vision, will produce intervals of exposure of each image equivalent to that obtainable with such a frequency without introducing the objectionable flicker identified therewith; to provide a simple and easily constructed shutter, and one which may be constructed from readily procurable materials; to provide a shutter which maintains portions of a projected image in stationary relationship to a screen even though the film from which the image is projected is moving; to provide means for refracting a beam of light projected from a source to a screen through means for defining the cross sectional shape of the beam, so that portions of the defined area of the beam projected on the screen will remain stationary when the beam-defining means is moved transverse to the axis of the beam; and to provide improved projectors for use with moving picture film.

Other objects of my invention will be apparent or will be specifically pointed out in the description forming a part of this specification, but I do not limit myself to the embodiment of the invention herein described, as various forms may be adopted within the scope of the claims.

Referring to the drawing:

Figure 1 is an elevational view, mostly diagrammatic in character and reduced to lowest terms, of a system incorporating the improved projection apparatus of my invention.

Figures 2 to 5 inclusive are diagrammatic views illustrating the means for refracting the projected light beam in different stages of arrangement.

Stated broadly, my invention comprises the combination, with apparatus for projecting in rapid sequence, a series of optical images on a surface from a motion picture film, or other means for defining the image, including means for intermittently moving elemental portions of said film or image-defining means into registry with a beam of light emanating from a light source and projected on said surface, and allowing said elemental portions to dwell for intervals in said beam, and a shutter for intersecting said beam at other intervals to obstruct passage of portions of the beam to the surface during movement of the film; of means operating in conjunction with said shutter for refracting portions of the beam so that portions of the area illuminated by the beam on the surface will remain in stationary relationship thereto during a portion of the movement of the film or beam-defining means.

At the present time extensive research work is being carried on in the field of the transmission of motion pictures by television. Heretofore, it has been the practice to utilize a standard motion picture projector for reproducing successive optical images from the motion picture film, which images may be scanned, in succession, by any of the several methods of scanning well known in the television art, to produce a train of television signals.

Most modern projectors, due to sound track requirements, are designed to shift the film intermittently at the rate of twenty-four picture frames per second and allow, in these intervals, for equal periods of exposure and concealment of the film; i. e., each picture frame will be uncovered by the projector shutter, to permit passage of the light beam, for one-forty-eighth of a second, and for a similar period will be covered by the shutter during shifting of the film to allow movement of the succeeding picture frame into registry with the light beam. It will be seen, therefore, that in televising a single image, a complete scansion thereof must occur within that fraction of a second comprising the stationary period. This means that, in order to produce a television image possessing the number of picture elements of a size necessary to bring out the fine detail of the image, the length of time that each element of the image is exposed to the scanning means is exceedingly short, due to the speed at which the scanning means must travel in order to cover the exposed image in the allotted time. The overall time of a complete film cycle cannot be changed, due to the second requirement of a ninety feet per minute rate of progression.

I have found that, without material alteration, the standard motion picture projector can be made to increase the time available for scansion without changing the existing ratio between the intervals of movement and rest of the film, and that the time between scansions may be decreased accordingly. This is accomplished by providing a shutter, including a prism of material permeable to light in one dimension and rotatable in synchronism with the movement of the film. This prism operates during the portions of time when the film is moving to refract the light beam and displace a portion of the projected image with respect to the picture on the film so that it is in position to be scanned before the film comes to rest in the light beam, and similarly to maintain a portion of the image in position when the film again starts to move. This means that scansion of the image may start before the film comes to rest and may continue after the film has started to move to bring the next succeeding picture frame into registry with the light beam.

In greater detail, the apparatus shown in Figure 1 represents apparatus, including one preferred form of the shutter of my invention, which may be used to transmit motion pictures by television. The film 2, depicting the action to be transmitted, is moved, by the intermittent sprocket 3, in the usual successive increments past the aperture 4, formed in a plate 5, which defines the light beam 6 emanating from the source 7 and passing through the condensing lens 8. An objective lens system 9 is provided in the path of the light beam for focusing the beam before suitable scanning apparatus.

This is accomplished by providing a gear 27 which is fixed on the shaft carrying the intermittent sprocket 3, which gear is in mesh, through an idler gear 28, with a pinion 29. The pinion is rotatable on a shaft 31, whose longitudinal axis lies in a plane transverse to the central axis of the light beam 6, and is connected for rotation with a tubular shutter frame 32, rectangular in cross section. A prism 33 of light pervious material, preferably glass, is cemented or otherwise secured in the shutter frame. The gear ratio between the intermittent sprocket shaft and the shaft 31 is such that the shutter frame will make one-half revolution for each quarter revolution of the sprocket; in other words the shutter will make one-half revolution during the shifting of each successive picture frame of the film 2.

Referring now to the diagrams shown in Figures 2 to 5 inclusive, we find that, in Figure 2, the positions of the elements are the same as in Figure 1, which position they occupy during each exposure of the film. The film in these diagrams is indicated by a series of joined arrows, the distance between the points thereof representing the length of each picture frame. The light beam 6 has been shown as comprising four parallel zones which will be useful in describing the operation of the shutter and prism to be explained directly. The objective lens system 9, of Figure 1, has been replaced, in the diagrams, with an apertured plate 34, similar to the plate 5, so that the deflection of the light beam may be more readily understood.

In Figure 3 the film has started to move downwardly, to bring a new picture frame into position before the aperture 4, and the shutter has rotated so that the leading edge of the upper portion of the frame thereof has advanced into registry with the receding edge of the previously exposed picture frame. As the prism rotates, from the position shown in Figure 2 to that shown in Figure 3, the angle of the prism faces, with respect to the axis of the beam, progressively changed with the result that the beam was refracted in passing through the prism an amount corresponding to the distance that the picture frame had been displaced with respect to the aperture 4. This progressively increasing refraction of the beam maintained the optical image in the same relationship with the aperture in the plate 34 as existed when the film frame was positioned directly before the aperture 4. Further movement of the film and consequently rotation of the shutter frame will cause the light beam to be cut off, as shown in Figure 4; and continued movement of the elements will create a condition which is shown in Figure 5; this being the reverse of what occurred during movement of the shutter frame to the position shown in Figure 3, in that the leading edge of the next succeeding picture frame of the film has been refracted so that that portion of the picture exposed through the prism is already alined with the aperture in the plate 34 even though the picture frame has not yet moved into alinement with the aperture 4. It will be readily seen by examination of the diagrams that exactly a fifty percent increase in the exposure time of each picture frame is obtained between the cut-off of the image, as shown in Figure 3, and the start of exposure of the image, as shown in Figure 5. It will also be seen that a reduction of like percentage is obtained in the dark period between exposures of successive picture frames of the film.

The improved shutter just described is characterized by simplicity, ease of construction, and ready applicability to existing motion picture projectors for the uses described above.

I claim:

1. The combination, with apparatus for projecting successive optical images from a motion picture film, of intermittent driving means so positioned and arranged as to maintain said film stationary before said projecting means for a definite interval of time, and to draw successive frames of said film into position during equal intervals of time, of a light-pervious prism and means associated with said film-driving means for rotating said prism one-half revolution for each one-frame advance of said film and in synchronism therewith, said prism being so constructed and arranged as to maintain the projected image of a portion of said film frames in a fixed position during the movement of said frames into and out of position before said projecting means.

2. The combination, with apparatus for projecting successive optical images from a motion picture film, of intermittent driving means so positioned and arranged as to maintain said film stationary before said projecting means for a definite interval of time, and to draw successive frames of said film into position during equal intervals of time, of a light-pervious prism and means associated with said film-driving means for rotating said prism one-half revolution for each one-frame advance of said film and in synchronism therewith, said prism being so constructed and arranged as to project the image of the leading edge of each film frame in a desired position while said frame is being drawn into position, and to project the image of the trailing edge of said frame in a desired position as said film is moved to present the next successive film frame to said projecting means.

3. The combination, with apparatus for projecting optical images from successive frames of a motion picture film, of film-driving means, a plano-parallel light-pervious prism, having one pair of oppositely disposed faces opaque, rotatably mounted between said film and said projecting apparatus, a driving mechanism connected to said film-driving means and to said prism so constructed and arranged as to move said film and said prism intermittently in synchronism, at the rate of one-half revolution of said prism to one film frame advance and to maintain said film and said prism at rest between said intermittent movements, said prism being dimensioned to project in normal position the leading portion of each film frame during the movement of said frame into position before said projecting means, and to project in normal position the trailing portion of said frame during movement of said frame out of position before said projecting means.

4. The combination, with apparatus for projecting successive optical images from a motion picture film including means for intermittently moving said film through a beam of light, of a shutter comprising a tubular opaque frame mounted rotatably in said beam of light, so positioned and arranged as to occult said beam during a portion of its angular rotation, and to pass said beam during the remaining portion, means driven by said film moving means for rotating said frame in synchronism therewith, one-half revolution for each one-frame advance of said film, and means mounted in said frame for refracting the image of said film frame at the beginning and end of said intermittent film movements by an amount sufficient to produce a stationary projected image thereof during the periods immediately prior and subsequent to said film movements.

5. The combination, with apparatus for projecting successive optical images from a motion picture film including means for intermittently moving said film through a beam of light, of a shutter comprising a tubular opaque frame mounted rotatably in said beam of light, so positioned and arranged as to occult said beam during a portion of its angular rotation, and to pass said beam during the remaining portion, means driven by said film moving means for rotating said frame in synchronism therewith, one-half revolution for each one-frame advance of said film, and a light pervious prism mounted in said frame, so proportioned as to refract the projected image of said film by an amount sufficient to produce a stationary projected image during the periods immediately prior and subsequent to stationary periods in said film movements.

PHILO T. FARNSWORTH.